US011070891B1

(12) United States Patent
Effinger et al.

(10) Patent No.: US 11,070,891 B1
(45) Date of Patent: Jul. 20, 2021

(54) OPTIMIZATION OF SUBTITLES FOR VIDEO CONTENT

(71) Applicant: Amazon Technologies, Inc., Seattle, WA (US)

(72) Inventors: Charles Effinger, Los Angeles, CA (US); Ryan Barlow Dall, Los Angeles, CA (US); Christian Garcia Siagian, Los Angeles, CA (US); Ramakanth Mudumba, Lake Forest, CA (US); Lawrence Kyuil Chang, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/708,996

(22) Filed: Dec. 10, 2019

(51) Int. Cl.
| | |
|---|---|
| *H04N 21/488* | (2011.01) |
| *H04N 21/43* | (2011.01) |
| *H04N 21/442* | (2011.01) |
| *H04N 21/4223* | (2011.01) |
| *G10L 15/26* | (2006.01) |

(52) U.S. Cl.
CPC ......... *H04N 21/4884* (2013.01); *G10L 15/26* (2013.01); *H04N 21/4223* (2013.01); *H04N 21/4307* (2013.01); *H04N 21/44218* (2013.01)

(58) Field of Classification Search
CPC .......... H04N 21/4884; H04N 21/4223; H04N 21/4307; H04N 21/44218; G10L 15/26
See application file for complete search history.

(56) References Cited

U.S. PATENT DOCUMENTS

| | | | |
|---|---|---|---|
| 2005/0060145 A1* | 3/2005 | Abe | H04N 21/4394 704/211 |
| 2007/0140656 A1* | 6/2007 | Ergin | H04N 21/8173 386/207 |
| 2009/0228948 A1* | 9/2009 | Guarin | H04N 5/278 725/137 |
| 2009/0273711 A1* | 11/2009 | Chapdelaine | G11B 27/34 348/465 |
| 2009/0303382 A1* | 12/2009 | Hamada | H04N 9/8233 348/468 |
| 2015/0271442 A1* | 9/2015 | Cronin | H04N 21/4394 348/464 |
| 2015/0277552 A1* | 10/2015 | Wilairat | G11B 27/28 386/244 |
| 2015/0304589 A1* | 10/2015 | Candelore | H04N 21/42222 348/563 |
| 2018/0191997 A1* | 7/2018 | Oh | H04N 21/2353 |
| 2018/0211556 A1* | 7/2018 | Sreedhara | G09B 5/06 |
| 2018/0309955 A1* | 10/2018 | Lawrence | H04N 19/17 |
| 2019/0037168 A1* | 1/2019 | Tsukagoshi | H04N 7/0885 |
| 2019/0394419 A1* | 12/2019 | Zhang | H04N 21/44008 |

* cited by examiner

*Primary Examiner* — John R Schnurr
(74) *Attorney, Agent, or Firm* — Knobbe, Martens, Olson & Bear, LLP

(57) ABSTRACT

A subtitle management system is provided that analyzes and adjusts subtitles for video content to improve the experience of viewers. Subtitles may be optimized or otherwise adjusted to display in particular regions of the video content, to display in synchronization with audio presentation of the spoken dialogue represented by the subtitles, to display in particular colors, and the like. Subtitles that are permanently integrated into the video content may be identified and addressed. These and other adjustments may be applied to address any of a variety of subtitle issues and shortcomings with conventional methods of generating subtitles.

20 Claims, 8 Drawing Sheets

US 11,070,891 B1

OPTIMIZATION OF SUBTITLES FOR VIDEO CONTENT

BACKGROUND

Generally described, subtitles provide a textual transcription of spoken dialogue in a video. Some types subtitles are provided permanently integrated into the video, e.g., "burned in" to the video such that the subtitles are always displayed during video playback and are not capable of being disabled a viewer. Other types of subtitles may be turned on and off at the discretion of the viewer.

Subtitles may be used for any of a variety of reasons. In some cases, viewers with hearing impairments can use subtitles to follow the dialogue in a video. In other cases, viewers who do not understand the language spoken in the video may use subtitles that provide a transcription of the dialog into a language that they understand. In yet other cases, viewers in loud environments, or viewers who are otherwise unable to turn the volume of the video to a level sufficient to follow the dialogue, may use subtitles as a substitute for—or augmentation to—the audio dialogue.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
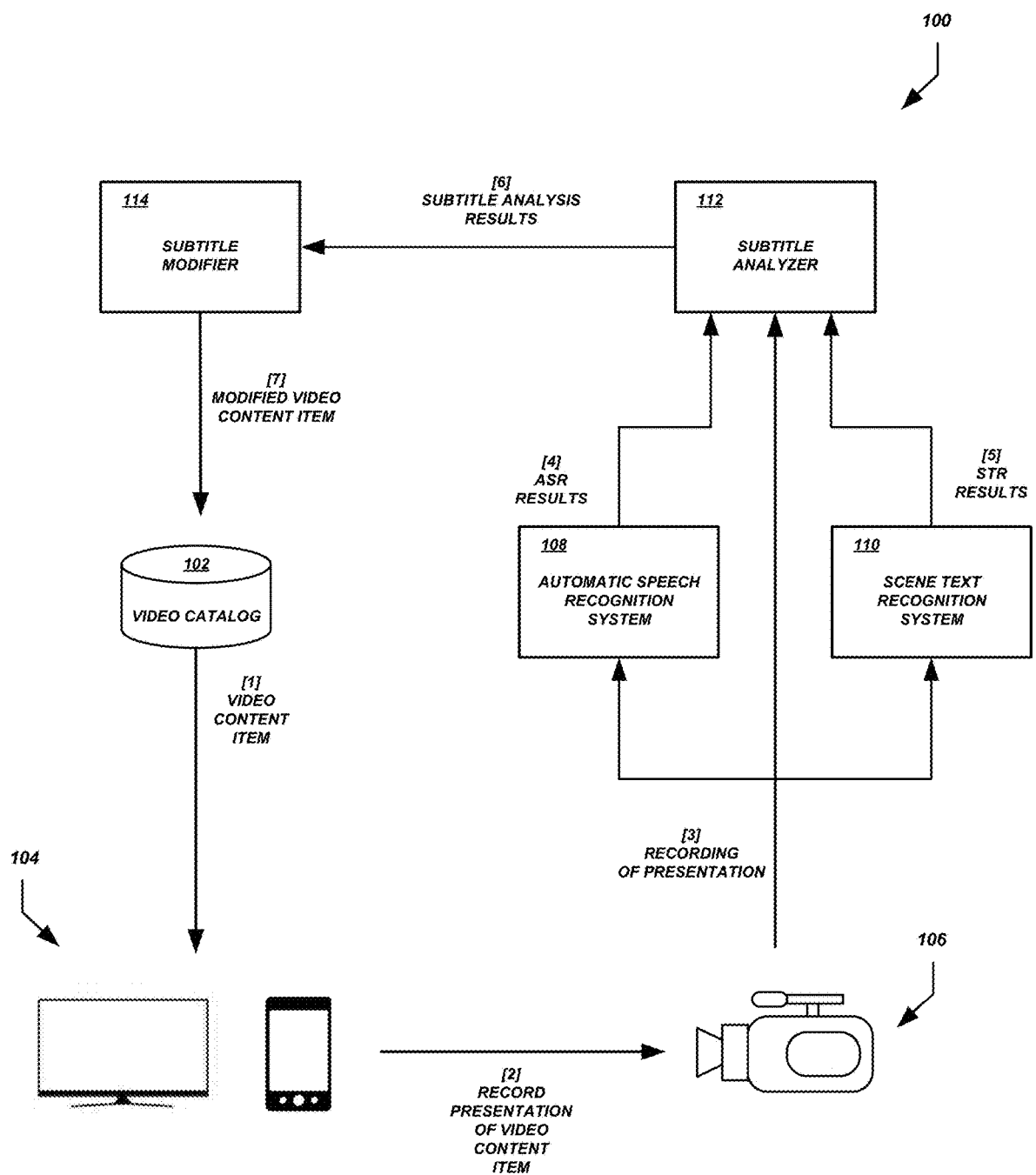
FIG. 1 is a block diagram illustrating various data flows and interactions between components of a subtitle management system according to some embodiments.

The present disclosure is directed a subtitle management system that analyzes and optimizes subtitles for video content to improve the experience of viewers. Subtitles may be optimized or otherwise adjusted to display in particular regions of the video content, to display in synchronization with audio presentation of the spoken dialogue represented by the subtitles, to display in particular colors, and the like. Subtitles that are permanently integrated into the video content may be identified and addressed. These and other adjustments may be applied to address any of a variety of subtitle issues and shortcomings with conventional methods of generating subtitles.

Some video content includes subtitles that are permanently integrated into the video ("burned in") such that the subtitles are always displayed during video playback and are not capable of being disabled by viewers. Such burned-in subtitles can be distracting to viewers who do not need or desire to see subtitles while viewing the video content. Other types of subtitles may be turned on and off at the discretion of the viewer. However, presentation of such optional subtitles is often associated with other issues that detract from the overall user experience. For example, display of the subtitles may not be adequately synchronized with the audio presentation of spoken dialogue represented by the subtitles. As another example, subtitles may not be displayed long enough for a viewer to read the entire subtitle, or may be displayed significantly longer than necessary. As yet another example, the screen location at which the subtitles are displayed may cause the subtitles to overlay or otherwise interfere with important or interesting visual aspects of the video content, or lack sufficient contrast with the underlying video content such that they are illegible. As a further example, subtitles may not be displayed in the same manner from device-to-device due to different presentation characteristics of the devices, and therefore video content with subtitles that are acceptable when displayed on one device may not be acceptable when displayed on another device. These and other issues can be distracting to a viewer or otherwise negatively impact the user experience when viewing video content with subtitles.

Some aspects of the present disclosure relate to monitoring presentation of video content on one or more devices, and analyzing the presentation of the video content to identify the subtitle issues noted above, among others. Video content with subtitles may be presented on devices such as televisions, computers, tablets, mobile phones, and the like. Presentation of the content may be monitored (e.g., using screen capture technology, using a physical video camera, etc.) such that video and audio of the content playback is recorded. The recorded video may be analyzed using scene text recognition ("STR") technology (sometimes referred to as optical character recognition ("OCR") technology) to identify the text that is displayed during playback. The text may include the subtitles and text that occurs naturally within the video content (e.g., the text of signs displayed in the background). The recorded audio may be analyzed using automatic speech recognition ("ASR") technology to determine the words of the spoken dialogue or narration of the video content. The STR results and ASR results may be jointly analyzed to identify issues such as lack of temporal synchronization between audio presentation and subtitle presentation, lack of subtitle display for an adequate period of time, etc. Video content may also be presented with subtitles disabled. The presentation may be monitored and analyzed using STR and ASR. The STR results may be analyzed to determine whether there is text that is consistently displayed in particular locations throughout the video, which would be indicative of burned-in subtitles. STR results may be analyzed jointly with ASR results to determine whether the displayed text consistently corresponds to spoken dialog, which is another indication of burned-in subtitles.

Additional aspects of the present disclosure relate to analyzing video content to determine an optimal or otherwise preferred location at which subtitles are to be presented. The video content may be analyzed using a viewer attention mapping model to identify the display region or regions of each portion of the video (e.g., of each frame, scene, or other subset of the video) that is most likely to be the focus of viewers' attention. For example, faces of main characters or characters currently speaking, or important objects central to a particular scene, may attract viewers' attention more than any other display region of the scene. Different candidate locations for subtitle display may be analyzed with respect to the display regions in each scene that are most likely to be the focus of the viewer's attention. Based on this analysis, the candidate location that is least likely to interfere with the viewers' attention (e.g., the location farthest way, on average, from the region of viewer focus during a scene) can be determined.

Further aspects of the present disclosure relate to addressing the issues noted above, among others, by modifying the presentation of subtitles in video content. If burned-in subtitles have been detected, the video content may be processed to hide the subtitles, or the video content may be flagged for viewers as including burned-in subtitles. If the presentation of subtitles is not temporally synchronized with the spoken dialogue represented by the subtitles, the timing of the subtitles can be adjusted. The timing of subtitles may also or alternatively be adjusted so that individual subtitles are displayed for an adequate length of time. The location at which subtitles are to be displayed can be set to the candidate location that is least likely to interfere with the viewers' attention. The color of the subtitles can be set to a color that contrasts with the underlying video content at the location of subtitle display. Advantageously, these modifications to video content with subtitles can provide a better experience for viewers.

Various aspects of the disclosure will now be described with regard to certain examples and embodiments, which are intended to illustrate but not limit the disclosure. Although aspects of some embodiments described in the disclosure will focus, for the purpose of illustration, on particular examples of video content analysis, subtitle attributes, and subtitle modifications, the examples are illustrative only and are not intended to be limiting. In some embodiments, the techniques described herein may be applied to additional or alternative video content analysis, subtitle attributes, and subtitle modifications.

Subtitle Management System

With reference to an illustrative embodiment, FIG. 1 shows a subtitle management system 100 in which aspects of the present disclosure may be implemented. As shown, the subtitle management system 100 may include various components and data stores for providing the features described herein. For example, subtitle management system 100 may include a video catalog 102 that stores video content. The video content may include videos with subtitles to be analyzed and potentially modified as described in greater detail below. The subtitle management system 100 may also include various video presentation devices 104 that may be used to present video content from the video catalog 102, and various video capture devices 106 that may be used to record presentation of the video content by the video presentation devices 104. The subtitle management system 100 may also include various components to analyze the recorded presentation of video content, such as an ASR system 108 and an STR system 110. The subtitle management system 100 may also include a subtitle analyzer 112 to analyze the recorded video and output from the ASR system 108 and STR system 110, identify issues with subtitles, and determine potential modifications to address the issues. The subtitle management system 100 may also include a subtitle modifier 114 to modify video content and improve the presentation of subtitles. The example components and data stores of the subtitle management system 100 shown in FIG. 1 are illustrative only, and are not intended to be limiting. In some embodiments, a subtitle management system 100 may have fewer, additional, and/or alternative components and data stores.

The subtitle management system 100 (or individual components thereof, such as the video catalog 102, ASR system 108, STR system 110, subtitle analyzer 112, subtitle modifier 114, etc.) may be implemented on one or more physical server computing devices. In some embodiments, the subtitle management system 100 (or individual components thereof) may be implemented on one or more host devices, such as blade servers, midrange computing devices, mainframe computers, desktop computers, or any other computing device configured to provide computing services and resources. For example, a single host device may execute one or more ASR systems 108, STR systems 110, subtitle analyzers 112, subtitle modifiers 114, video catalogs 102, some combination thereof, etc. The subtitle management system 100 may include any number of such hosts.

In some embodiments, the features and services provided by the subtitle management system 100 may be implemented as web services consumable via one or more communication networks. In further embodiments, the subtitle management system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual video presentation devices 104 that may be used to present video content from the video catalog 102 may be any of a wide variety of electronic devices with video presentation capabilities, including televisions, personal computing devices, laptop computing devices, tablet computing devices, electronic reader devices, wearable computing devices, mobile devices (e.g., cellular and other mobile phones, smart phones, media players, handheld gaming devices, etc.), set-top boxes, streaming media devices, smart home appliances, and various other electronic devices and appliances. The individual video capture devices 106 that may be used to record presentation of the video content by the video presentation devices 104 may be any of a wide variety of electronic devices with video capture capabilities, including stand-alone video cameras or computing devices with integrated video capture capabilities (e.g., desktop computers, laptop computers, smart phones, and various other electronic devices and appliances). In some embodiments, a video presentation device 104 may include integrated video capture capabilities, such as a screen capture subsystem that records what is presented by the video presentation device 104, optionally including user interactions with the video content.

Individual components of the subtitle management system 100 may communicate with each other via a communication network (not shown), also referred to simply as a "network." The network may be a publicly-accessible network of linked networks, possibly operated by various distinct parties, such as the Internet. In some cases, the network may be or include a private network, personal area network, local area network, wide area network, global area network, cable network, satellite network, cellular data network, etc., or a combination thereof, some or all of which may or may not have access to and/or from the Internet.

As shown in FIG. 1, at [1] a video content item from the video catalog 102 may be provided to one or more video presentation devices 104 for presentation by the video presentation devices 104. Although the example that follows will focus on the video content item being presented by one video presentation device 104, the example is illustrative only and not intended to be limiting. In some embodiments, the same video content—or different versions of the same video content—may be presented by different video presentation devices 104 and the presentation may be analyzed to detect differences in playback and subtitle display on different video presentation devices 104, such as devices with different display resolutions, processing capabilities, form factors, and the like.

The video content item that is provided to a video playback device 104 may be a digital file or stream that is transmitted to the video presentation device 104 (or to a component that presents the video content item via the video presentation device 104). For example, the video content may be streamed to the video presentation device 104 during presentation of the video, or the video content may be downloaded in its entirety to the video presentation device 104. The video content item may also be referred to simply as "video content" for convenience.

At [2], a video capture device 106 may record playback of the video content by the video presentation device 104. The video capture device 106 may be or include a video camera that is positioned to record the display of the video presentation device 104. The video capture device 106 may also include or be coupled to an audio capture device (not shown), such as a microphone, that is positioned to record presentation of audio by the video presentation device 104 (e.g., audio presented via a speaker that is integrated with or otherwise in communication with the video presentation device 104). In some embodiments, a separate video capture device 106 may not be used to record playback of the video content by the video presentation device 104. Instead, the video presentation device 104 may be configured to record what is visually presented by the display and audibly presented by a speaker of the video presentation device 104. For example, the video presentation device 104 may include a screen capture application. In such cases, the video presentation device 104 may not necessarily present the video and/or audio external to the video presentation device 104, but may instead simulate such presentation and record the simulated presentation.

At [3], the video capture device 106 (or the video presentation device 104 itself) can provide a recording of the video content, presented by the video presentation device 104, to one or more components of the subtitle management system 100 for analysis. The recording of the presented video content—also referred to simply as "the recording" for convenience and to distinguish it from the original video content that was presented—may be a single file or stream that includes video and audio. In some embodiments, the recording may consist of multiple files or streams, such as separate files or streams for the video and audio components of the recording. Illustratively, the recording may be provided to the ASR system 108, STR system 110, subtitle analyzer 112, or some combination thereof.

At [4], the ASR system 108 can analyze the recording and generate and provide ASR results to the subtitle analyzer 112. The ASR results may be or include transcript data or some other textual representation of the spoken dialogue that was included in the recording of the video content playback. The ASR results may include timing data for each word, phrase, sentence, or other subset of spoken dialogue that is detected. The timing data may indicate the elapsed time (e.g., number of milliseconds or seconds from the start of the video content) at which the dialogue was spoken. In some embodiments, the ASR results may also indicate a likely source of the dialogue, such as a particular character in the video detected using voice recognition or speaker identification technology.

At [5], the STR system 110 can analyze the recording and generate and provide STR results to the subtitle analyzer 112. The STR results may be or include displayed text data indicating the text that was detected on screen, including subtitles and naturally-occurring text (e.g., background signs). The STR results may include timing data for each word, phrase, sentence, or other subset of text that is detected. The timing data may indicate the elapsed time (e.g., number of milliseconds or seconds from the start of the video content) at which the text was displayed, the frame or set of frames on which the text was displayed, or the like. The STR results may also include location data, such as coordinates indicating the location at which the text was displayed.

At [6], the subtitle analyzer 112 can analyze the recording and identify various characteristics that may be used to modify the video content to improve the presentation of subtitles or otherwise to improve the viewer's experience. For example, the subtitle analyzer 112 may determine whether there are burned-in subtitles in the video content. This determination may be based on a recording of the video content being presented without discretionary subtitles being activated. As another example, the subtitle analyzer may determine whether presentation of the subtitles is synchronized with the spoken dialog represented by the subtitles and/or whether the subtitles are displayed for a sufficient period of time. As a further example, subtitle analyzer can determine an optimal or otherwise preferred display location for the subtitles and/or an optimal or otherwise preferred display color for the subtitles.

At [7], the subtitle modifier 114 can modify the video content to address various issues, such as those identified by the subtitle analyzer 112. The modified video content may be stored to the video catalog 102 and made available to viewers. In some embodiments, the presentation of the modified video content may be re-recorded and re-analyzed as described above and in greater detail below to determine whether any new issues have been introduced by modifying the video content, whether the previously-detected issues have been adequately addressed, and the like.

Figure 2:
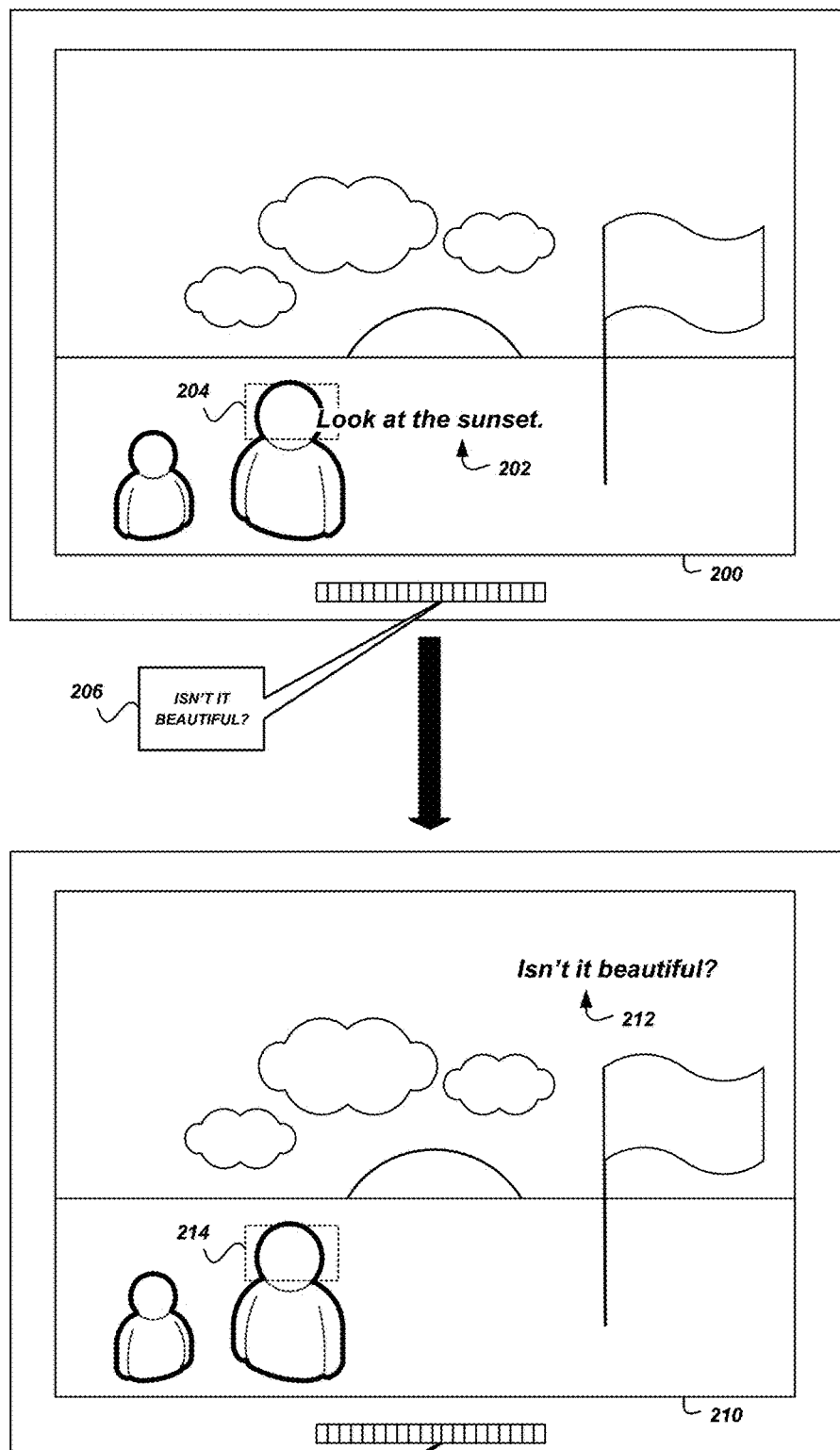
FIG. 2 is a set of diagrams of various issues with subtitles of a video before processing by the subtitle management system, and subtitles of the video after processing by the subtitle management system according to some embodiments.

FIG. 2 illustrates presentation of a video content scene and various potential issues with subtitles for the scene. As shown in the display 200, subtitles 202 are presented in a location that is overlaying or otherwise interfering with a location of interest 204. In addition, the subtitles 202 are out of sync with the spoken dialogue 206 that is presented. As shown, the subtitles 202 read "Look at the sunset." while the spoken dialogue 206 is "Isn't it beautiful?" Further, although not shown in the figure, color of the subtitles 202 may not be sufficiently distinct from the predominant color of the location at which the subtitles 202 are presented.

FIG. 2 also illustrates the same scene after processing by the subtitle management system 100 with modifications applied by the subtitle modifier 114 to address the issues shown in display 200. As shown in the display 210, subtitles 212 are presented in a location does not interfere with the location of interest 214. In addition, the subtitles 202 are now in sync with the audio dialogue 216 that is presented. As shown, the subtitles 212 read "Isn't it beautiful?" and the audio dialogue 216 is also "Isn't it beautiful?" Further, although not shown in the figure, the color of the subtitles 212 may have been modified to contrast with the predominant color of the location at which the subtitles 212 are now presented.

An example process for detecting and addressing burned-in subtitles is described below with respect to FIG. 3, and an example process for detecting and addressing various other issues and aspects of subtitle display is described below with respect to FIG. 4.

Example Process for Detecting Burned-in Subtitles

Figure 3:
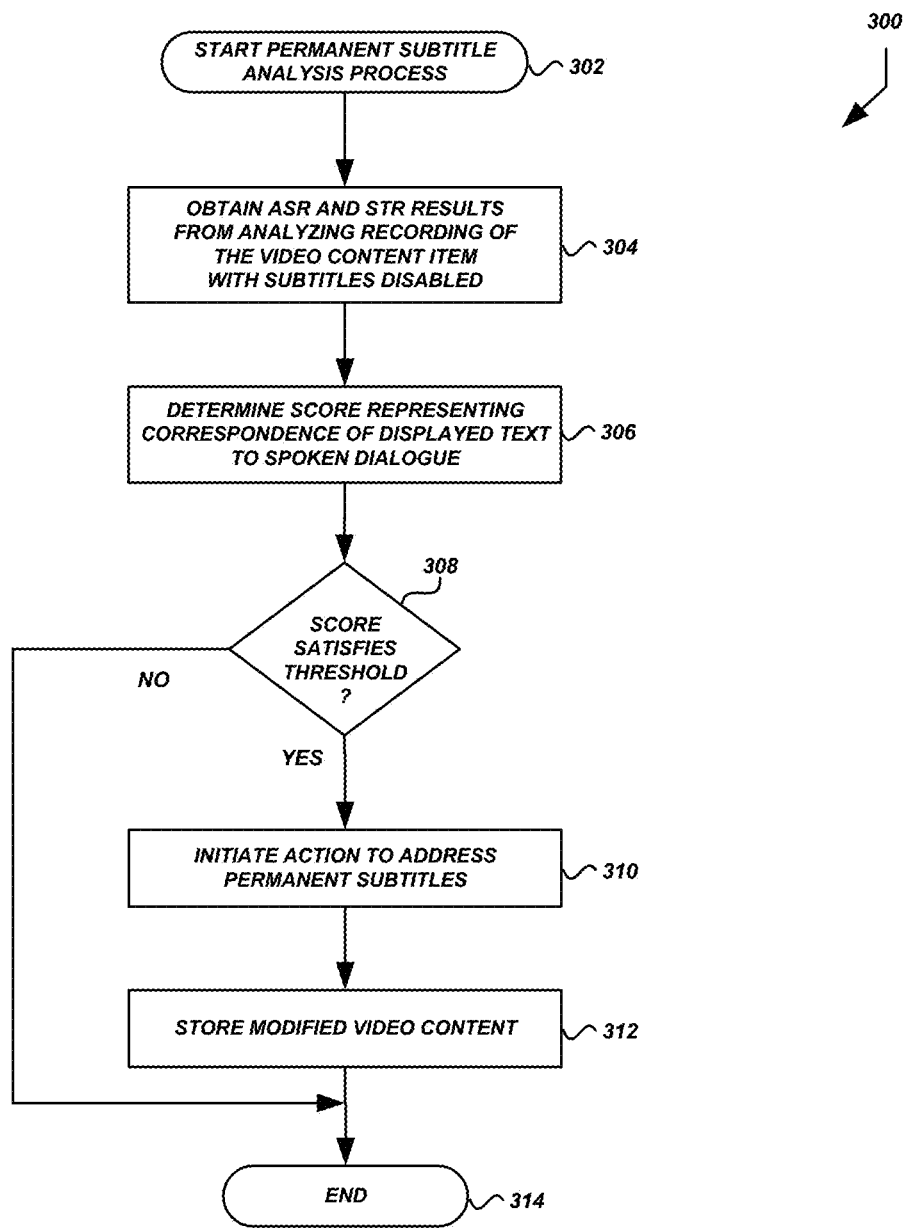
FIG. 3 is a flow diagram of an illustrative process for identifying permanent subtitles in a video according to some embodiments.

FIG. 3 is a flow diagram of an illustrative process 300 that may be executed by a subtitle management system 100 to analyze a recording of a presentation of video content, detect burned-in subtitles, and implement remedial actions to address the presence of the burned-in subtitles.

The process 300 begins at block 302. The process 300 may begin in response to an event, such as when the subtitle management system 100 begins operation, or receives a recording of a presentation of video content. When the process 300 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 800 shown in FIG. 8 and described in greater detail below. For example, executable instructions for implementing the functionality of the subtitle analyzer 112 and/or subtitle modifier 114 may be loaded into memory and executed by a processor. In some embodiments, the process 300 or portions thereof may be implemented on multiple processors, serially or in parallel.

At block 304, the subtitle management system 100 can obtain ASR results and STR results from processing a recording of a presentation of video content with discretionary subtitles (if any) disabled. The presentation of the video content may be recorded with discretionary subtitles disabled in order to determine whether there are burned-in subtitles present in the video content, or whether there is some other subtitle-based issue (e.g., disabling discretionary subtitles is not working on the particular video presentation device 104 that was recorded).

At block 306, the subtitle management system 100 can determine a similarity score representing a degree to which the STR results for one or more portions of the recording correspond to ASR results for the same one or more portions of the recording. If the STR results correspond sufficiently to the ASR results, the correspondence may indicate the presence of subtitles of the dialogue spoken during the video content. Because the recording is of the video content being presented with discretionary subtitles disabled, the presence of subtitles may indicate that the subtitles are burned-in, or may indicate another subtitle-based issue.

In some embodiments, the determined score may represent or otherwise be based on a number of differences between the ASR results and STR results. For example, the score may represent or otherwise be based on a Levenshtein distance or edit distance. The subtitle management system 100 can compare a transcript of the dialogue (derived from the ASR results) to the text, if any, that was displayed on the screen during the dialogue (derived from the STR results). The subtitle management system 100 may determine the number of character edits (e.g., insertions, deletions, and substitutions) that would have to be made to the transcript of the dialogue to arrive at the text that was displayed onscreen during the dialogue, or vice versa. The number of edits may be used as the similarity score.

In some embodiments, other visual characteristics of the recording may be used when determining the similarity score, or to determine an additional or alternative score indicative of the likelihood that the video content includes burn-in subtitles. For example, the STR results may include location information (coordinates or other region identifiers, region sizes, etc.) that indicates where text is displayed within a frame or scene. The subtitle management system 100 may analyze the location information to determine whether there is text that is consistently displayed in a particular location during a scene (or in the video content as a whole). If there is text consistently displayed in a particular location during a scene, the subtitle management system 100 may factor this feature into a score (e.g., the similarity score or some other score) that is used to determine whether there are likely burned-in subtitles present in the video content.

At decision block 308, the subtitle management system 100 can determine whether the similarity score satisfies a similarity threshold. If so, the process 300 can proceed to block 310. Otherwise, the process 300 can proceed to block 314. For example, the subtitle management system 100 may determine whether the similarity score represents a number of edits that is less than or equal to a predetermined or dynamically-determined maximum number of edits to the dialogue transcript for the dialogue transcript to match the displayed text. In this case, the similarity threshold is the maximum number of edits. Illustratively, the similarity threshold may be zero or some non-zero number. In some embodiments, the similarity threshold may be set to a value greater than zero in order to account for inaccuracies in the ASR process, inaccuracies in the STR process, errors in the subtitles of the original video content, and the like.

If the similarity score is less than or equal to the similarity threshold, the subtitle management system 100 may determine that there are likely subtitles present in the recording. If the similarity score exceeds the similarity threshold, indicating the number of edits to the dialogue transcript that would be necessary for the dialogue transcript to match the displayed text is larger than acceptable, then the subtitle management system 100 may determine that there are likely not subtitles present in the recording.

At block 310, the subtitle management system 100 can initiate one or more actions to address the presence of the subtitles. The subtitle modifier 114 may process the original video content (rather than the recording of presentation of the video content), and modify one or more display characteristics of the video content to remove, hide, or otherwise address the burned-in subtitles.

In some embodiments, the subtitle modifier 114 may obtain STR result data that specifies the location and/or display region at which the burned-in subtitles are displayed. The subtitle modifier 114 can modify display characteristics of the video based on the determined subtitle display region. For example, the subtitle modifier 114 may analyze the coloring, texture, or other display characteristics of the video content in or near the subtitle display region, and apply similar coloring, texturing, or the like to the subtitle text to at least partly occlude the subtitles or blend them with the rest of the display region and disguise their appearance. As another example, the subtitle modifier 114 may crop the video to exclude all or substantially of the subtitle display region (e.g., if the subtitles are displayed in substantially the same region near an edge of the display for a scene or set of frames). As a further example, burned-in subtitles may be addressed by "panning" or otherwise adjusting the viewport so that the subtitle display region is not displayed (e.g., if the subtitles are displayed in different regions from scene-to-scene or frame-to-frame). The subtitle management system 100 may perform any of these display characteristic modifications, or some combination thereof, to address burned-in subtitles. In some embodiments, the subtitle management system 100 may not modify display characteristics of the video content, but may instead flag the video content for viewers so that they are aware of the presence of burned-in subtitles. In some embodiments, the subtitle management system 100 may flag the video content for replacement with a different version of the video content that may not have burned-in subtitles.

At block 312, the subtitle management system 100 can store the modified video file. For example, the subtitle management system 100 may store the modified video file in the video catalog 102 as a replacement for, or different version of, the original video content.

At block 314, the process 300 may terminate. In some embodiments, once burned-in subtitles have been addressed or not detected, the subtitle management system 100 may proceed with analysis of a recording of the video file with discretionary subtitles enabled to detect and address issues with the subtitles as described in greater detail below.

Example Process for Analyzing Subtitles

Figure 4:
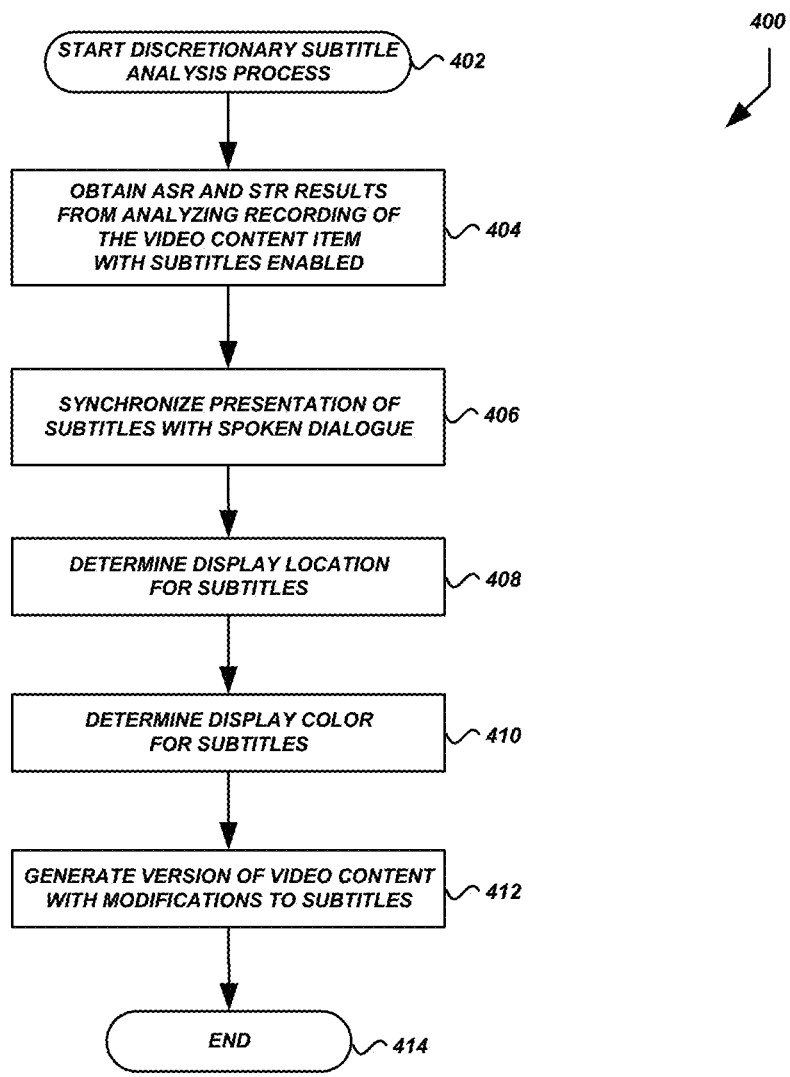
FIG. 4 is a flow diagram of an illustrative process for identifying and addressing issues with configurable subtitles for a video according to some embodiments.

FIG. 4 is a flow diagram of an illustrative process 400 that may be executed by a subtitle management system 100 to analyze a recording of a presentation of video content with subtitles enabled, and then implement modifications to improve the display of subtitles and the user experience.

The process 400 begins at block 402. The process 400 may begin in response to an event, such as when the subtitle management system 100 begins operation, or receives a recording of a presentation of video content, or has completed the burned-in subtitle analysis described above. When the process 400 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 800 shown in FIG. 8 and described in greater detail below. For example, executable instructions for implementing the functionality of the subtitle analyzer 112 and/or subtitle modifier 114 may be loaded into memory and executed by a processor. In some embodiments, the process 400 or portions thereof may be implemented on multiple processors, serially or in parallel.

At block 404, the subtitle management system 100 can obtain ASR results and STR results from processing a recording of a presentation of video content with discretionary subtitles enabled. The presentation of the video content may be recorded with discretionary subtitles enabled in order to determine whether there are issues with the subtitles (e.g., synchronization issues), to determine whether aspects of the subtitles can be improved (e.g., display location and color), and the like.

Figure 5:
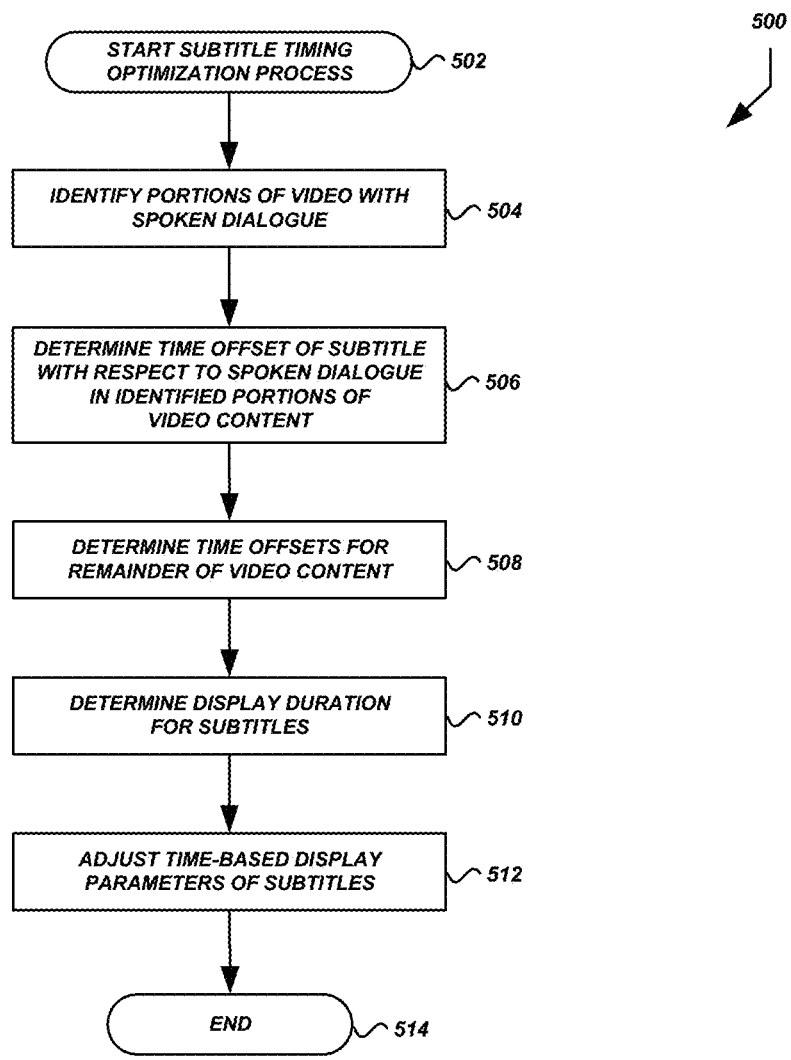
FIG. 5 is a flow diagram of an illustrative process for synchronizing configurable subtitles for a video according to some embodiments.

At block 406, the subtitle management system 100 can analyze the ASR results and STR results to determine whether the subtitles are out-of-synchronization with the spoken dialogue represented by the subtitles. The subtitle management system 100 can then adjust the timing of subtitle presentation so that the display of subtitles representing particular dialogue is synchronized or substantially synchronized with the audio presentation of the spoken dialogue represented by the subtitles. An example process for synchronizing the presentation of subtitles is shown in FIG. 5 and described in greater detail below.

Figure 6:
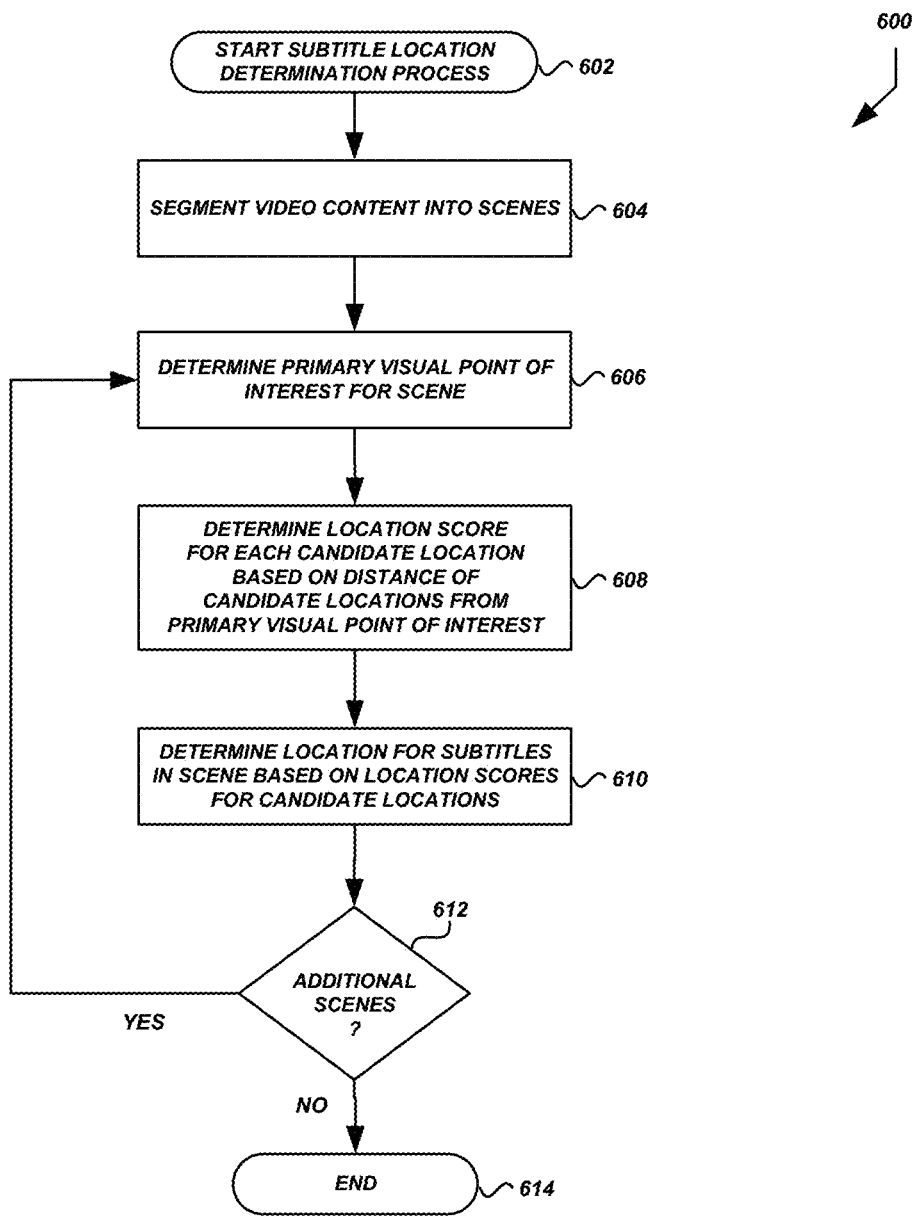
FIG. 6 is a flow diagram of an illustrative process for setting the location and color of configurable subtitles for a video according to some embodiments.

At block 408, the subtitle management system 100 can analyze the recording to determine a location or display region at which subtitles are to be displayed. The subtitle management system 100 can use a model of human video attention to determine the points or regions of individual scenes of the video content that are most likely to be important or otherwise attract viewer attention. The subtitle management system 100 can then determine a location at which to display subtitles that will not interfere with or distract viewers' attention from the important points or regions. An example process for determining the location or display region at which subtitles are to be display is shown in FIG. 6 and described in greater detail below.

At block 410, the subtitle management system 100 can analyze the location at which subtitles are to be displayed and determine what color the displayed subtitles should be. In some embodiments, the subtitle management system 100 can determine one or more visual characteristics of the subtitle display location. The subtitle management system 100 can then determine one or more visual characteristics of the subtitles to provide an optimal or otherwise comparatively high degree of visual contrast with the subtitle display location. For example, the subtitle management system 100 can determine the predominant HSV (hue, saturation, value) at the subtitle display location. The subtitle management system 100 can then select a complementary or otherwise contrasting HSV for the subtitles. The contrasting color for display of subtitles may be one with a large degree of difference in measured brightness (e.g., the "V" component of HSV) and/or one that is complementary or otherwise has a large difference in hue (e.g., the "H" component of HSV). This process may be repeated for each scene, each change in subtitle display location, or the like. In some embodiments, alternative visual characteristics may be determined and selected, such as RGB (red, green blue), HSL (hue, saturation, lightness), or the like.

At block 412, the subtitle management system 100 can store the modified video file. For example, the subtitle management system 100 may store the modified video file in the video catalog 102 as a replacement for, or different version of, the original video content. The modified video file can include or be associated with subtitle data that reflects the modifications determined above, such as display timing, display location, display color, or some combination thereof.

At block 414, the process 400 may terminate. The example subtitle display characteristics described above are illustrative only, and are not intended to be exhaustive, required, or limiting. In some embodiments additional, fewer, and/or alternative display characteristics for subtitles may be determined or modified. In addition, different display characteristics may be used for different subtitles of a single video content item, where a single subtitle refers to a single set of text to be displayed during a first timeframe, and display of the subtitle ends (and is possibly replaced by another subtitle) at the end of the first timeframe or otherwise before a second timeframe, etc. For example, the display size of a subtitle may be determined in terms of the total display area required to display the subtitle in a particular font type and/or font size. If the display size exceeds a predetermined or dynamically determined threshold, then the font characteristics (e.g., type and/or size) may be adjusted to ensure that the subtitle fits within or substantially within a display region at which the subtitle is to be displayed. The font characteristics may be determined on a per-subtitle basis (the font characteristics of each subtitle are optimized), a per-scene basis (e.g., all subtitles in a scene use the same font characteristics based on the font characteristics needed to fit the largest subtitle of the scene within the display region), or globally for an entire video content item.

Example Process for Synchronizing Subtitles

FIG. 5 is a flow diagram of an illustrative process 500 that may be executed by a subtitle management system 100 to synchronize display of subtitles with presentation of spoken dialogue represented by the subtitles.

The process 500 begins at block 502. The process 500 may begin in response to an event, such as when the process 400 described above reaches block 406. For example, executable instructions for implementing the functionality of the subtitle analyzer 112 and/or subtitle modifier 114 may include instructions for executing the process 500. In some embodiments, the process 500 or portions thereof may be implemented on multiple processors, serially or in parallel.

At block 504, the subtitle management system 100 can identify one or more portions of the video content or the recording thereof to determine when spoken dialog occurs. For example, the subtitle management system 100 may use the timing data and text data in—or derived from—the ASR results to determine portions of the video content with spoken dialogue. The subtitle management system 100 may identify a predetermined or dynamically-determined number of points within the video content, such as scenes or subsets of frames, at which to analyze the synchronization of spoken dialogue with respect to presentation of subtitles representing the spoken dialogue.

At block 506, the subtitle management system 100 can analyze the ASR results and STR results (or subtitle metadata associated with the video content) for the identified portions of the video content to determine a degree to which presentation of subtitles is offset or otherwise out of synchronization with the spoken dialog represented by the subtitles. In some embodiments, the subtitle management system 100 may align a transcript of the spoken dialogue with the subtitles for the spoken dialogue by determining similarity scores for different alignments. For example, the subtitle management system 100 may determine a Levenshtein distance or edit distance based on the number of character edits (e.g., insertions, deletions, and substitutions) that would have to be made to the transcript of the dialogue for the transcript to match the subtitle text for a particular alignment. This process may be repeated with different alignments that correspond to different degrees of temporal offset between the transcript and subtitles. For example, the process may be repeated by determining a similarity score, such as a Levenshtein distance, for a portion of the transcript with respect to each portion of the subtitle text. The offset that produces the highest degree of similarity (e.g., the smallest edit distance, where an edit distance value of value of 0 indicates the transcript and subtitles match exactly) may be selected. This offset may correspond to a temporal value, such as a number of seconds or milliseconds. Illustratively, an offset value of 500 milliseconds (ms) may indicate that a subtitle shows up 500 ms after the spoken dialogue represented by the subtitle has begun, while an offset value of −750 milliseconds (ms) may indicate that a subtitle shows up 750 ms before the spoken dialogue represented by the subtitle has begun. The example offset values and correspondences are illustrative only, and are not intended to be limiting. In some embodiments, the offset values may represent an offset from when spoken dialogue has reached a midpoint or ended. In some embodiments, a negative offset value may indicate that a subtitle shows up after the spoken dialogue represented by the subtitle has begun, reached a midpoint, or ended.

At block 508, the subtitle management system 100 can use the offsets determined above for multiple different points within the video content to determine offsets for the remainder of the video content. In some embodiments, the offsets determined above may be analyzed using linear regression to determine a function that represents the offset at any point during the video content. For example, the offsets determined for multiple points within the video content may be plotted, and a line may be fitted to the plot to approximate the relationship between elapsed time of the video content and the offset between display of a subtitle and audio presentation of spoken dialogue represented by the subtitle. Once a function that defines the approximated line is determined, the function may be used to determine the offset at any point during the video content. The example method of approximating offsets during the video content is illustrative only, and is not intended to be limiting. In some embodiments, a different method of approximating offsets may be used.

At block 510, the subtitle management system 100 can determine the duration of time that subtitles are to be displayed. The duration may be determined based on the length of the subtitles. For example, a subtitle of length i (where i represents the number of characters, syllables, or words in the subtitle) may be displayed for a period of m ms, while a subtitle of length j (where j>i) may be displayed for a period of n ms (where n>m). In some embodiments, the display duration may be determined as a function of the number of characters, syllables, or words in the subtitle to be displayed. The example method of determining the display duration of subtitles is illustrative only, and is not intended to be limiting. In some embodiments, a different method of determining display durations may be used.

At block 512 the subtitle management system 100 can adjust time-based display parameters for the subtitles based on the determined offsets and/or display durations determined above. In some embodiments, subtitles may be specified in a file or metadata structure that is associated with the video content. For each subtitle to be displayed, the file or metadata structure may indicate: the words to be displayed; a display time (e.g., a quantity of elapsed time from the beginning of the video content or the beginning of some internal division within the content, such as a scene or chapter) at which the subtitle is to be displayed; a display duration (e.g., a quantity of time for which the subtitle is to be displayed); and/or other display parameters for subtitles. In some embodiments, the subtitle management system 100 can adjust the display time by determining an offset for the display time using, e.g., the function determined above. The offset may then be added or subtracted from the display time to synchronize or substantially synchronize display of the subtitle to the audio presentation of the dialogue represented by the subtitle. In some embodiments, the subtitle management system 100 can set the display duration to the duration determined above.

At block 514, the process 500 may end.

Example Process for Determining Subtitle Location

FIG. 6 is a flow diagram of an illustrative process 600 that may be executed by a subtitle management system 100 to determine an optimal or otherwise preferred location for display of subtitles.

The process 600 begins at block 602. The process 600 may begin in response to an event, such as when the process 400 described above reaches block 408. For example, executable instructions for implementing the functionality of the subtitle analyzer 112 and/or subtitle modifier 114 may include instructions for executing the process 600. In some embodiments, the process 600 or portions thereof may be implemented on multiple processors, serially or in parallel.

At block 604, the subtitle management system 100 can identify different scenes or other portions of the video content. A scene may include a subset of frames of the video content that occur sequentially and share or are otherwise associated with a particular presentation characteristic such as volume, brightness, color, predetermined divisions, or the like. For example, a scene may be a portion of a video with a constant volume or average volume that is statistically different than the volume of the portions before and/or after the particular portion. An analysis of the audio portion of the video content can be performed to identify such volume levels and changes. As another example, a scene may be a portion of a video with a constant or average brightness level or dominant color that is different than the portions before and/or after the particular portion. An analysis of the video content can be performed to identify such visual characteristics and changes. As a further example, the video content may be pre-segmented into scenes (e.g., different chapters).

At block 606, the subtitle management system 100 can determine the primary visual point(s) of interest for each of the scenes of the video content, or some subset thereof. In general, the most likely primary visual point or region of interest may correspond to a human face or to an object that is important in the context of the scene or overall video content. The primary visual point or region of interest may be referred to simply as the primary visual point of interest for convenience. The subtitle management system 100 may analyze a scene using an attention model or saliency model to determine a point (e.g., coordinates) or region (e.g., area defined by coordinates or a combination of coordinates and size) that is most likely to be the primary visual point of interest. In some embodiments, a machine learning model may be trained using eye tracking data regarding where viewers' look on the display screen during video playback. The training process can produce a model configured to detect the regions likely to attract the most interest. The video content may be analyzed using the model to identify the primary visual point of interest. Illustratively, analyzing the video content using the model may include center-surround processing that integrates the localized "center" with contextual or "surround" information into a more global representation, thus minimizing the effect of entities that are commonplace within the context.

Figure 7A:
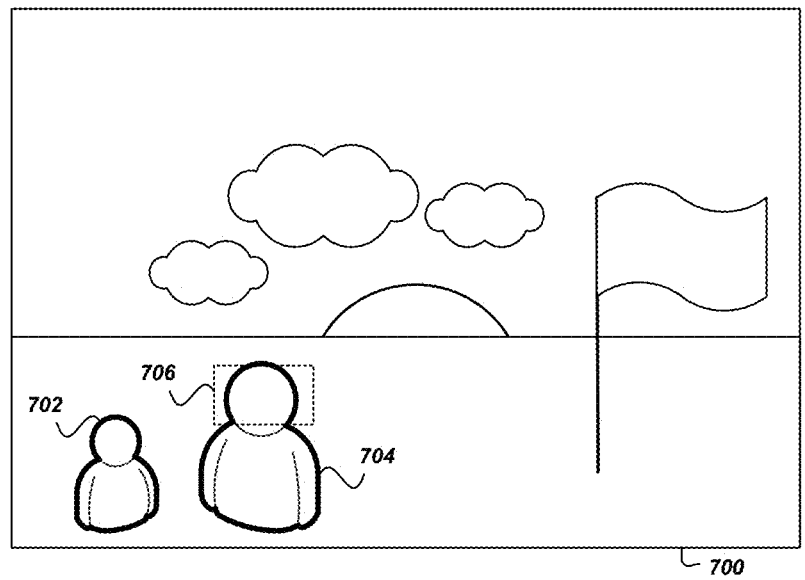
FIGS. 7A and 7B are diagrams of a video frame showing a primary visual point of interest and various candidate locations for subtitles according to some embodiments.

FIG. 7A illustrates a frame 700 of video content. In the frame, there are two people 702, 704 engaging in a conversation. Using a model configured to determine the most likely visual point of interest, the subtitle management system 100 has identified region 706 as the primary visual point of interest in this frame 700. The process of determining the primary visual point of interest may be repeated for each frame in a scene, or for a subset of frames in a scene, to account for changes in the location of the primary visual point of interest from frame-to-frame. For example, a person may be moving across the display in the scene, and the location of that person's face in each frame may be the primary visual point of interest for the frame.

Once a primary visual point of interest is determined for a particular scene (or for a set of frames of a scene), the subtitle management system 100 can determine a location at which subtitles are least likely to interfere with or distract viewers from the primary visual point of interest. The process of determining the location for display of the subtitles may involve an iterative analysis of multiple candidate locations for display of subtitles. In some embodiments, the subtitle management system 100 may segment the display area into a number of candidate locations, such as by applying a grid of candidate locations at which subtitles may be displayed (or at which display of subtitles may begin, such as the location of the first letter or word of a subtitle).

Figure 7B:
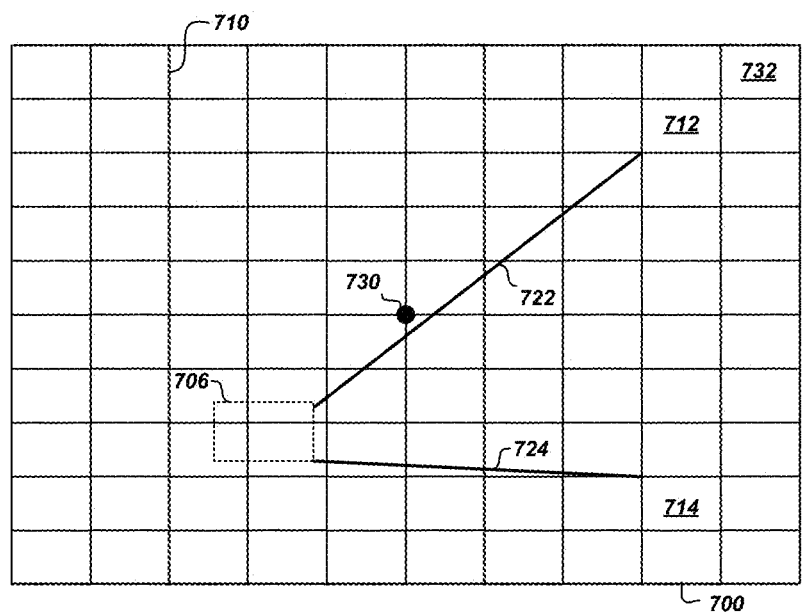

FIG. 7B shows the frame 700 of video discussed above with respect to FIG. 7A, segmented into a set of candidate locations. As shown, the segmentation is accomplished by applying a grid 710. The subtitle management system 100 may analyze each candidate location defined by the grid 710, or some subset thereof, to determine the candidate location at which subtitles are to be displayed. Illustratively, the description of process 600 focuses on only two of the candidate locations: first candidate location 712 and second candidate location 714. However, in practice any or all of the candidate locations in the frame 700 may be analyzed.

At block 608, the subtitle management system 100 can determine, for each candidate location to be considered, a location score that will be used to select the candidate location at which subtitles are to be displayed. The location score for each candidate location may be based on the distance between the candidate location and the primary visual point of interest. The distance may be a Euclidian distance, such as the number of units (e.g., pixels or some other unit of distance) in a straight line connecting the candidate location and the primary visual point of interest. The subtitle management system 100 may determine the distance by determining the number of units between the candidate location and the primary visual point of interest (e.g., if the line between the candidate location and primary visual point of interest is a vertical or horizontal line). In some embodiments, the distance may be determined using a formula, such as the Pythagorean theorem for determining the length of a hypotenuse of a right triangle. For example, the subtitle management system 100 may determine the number of units in a horizontal direction and the number of units in a vertical direction that separate the candidate location and the primary visual point of interest. The distance between the candidate location and primary visual point of interest may then be determined using the Pythagorean theorem: $a^2+b^2=c^2$; where a=the number of units in the horizontal direction, b=the number of units in the vertical direction, and c=the distance in units between the candidate location and primary visual point of interest.

As shown in FIG. 7B, the first candidate location 712 may be distance 722 from region 706, which is the primary visual point of interest. The second candidate location 714 may be distance 724 from region 706. The process of determining the distance between each candidate location and the primary visual point of interest may be repeated for each frame in a scene, or for a subset of frames in a scene, to account for changes in the location of the primary visual point of interest from frame-to-frame.

In some embodiments, the location score for a given candidate location may be adjusted—or determined directly—by applying a weight to the determined distance of the candidate location from the primary visual point of interest. The weight may be selected from a set of weights that includes a weight associated with each different candidate location (or subset of candidate locations). Collectively, the set of weights may be configured to bias the location scores such that candidate locations closer to a central point 730 of the frame tend to have higher scores than those farthest away. In this way, the combination of the weight for each candidate location (which biases the score in favor of candidate locations closer to the central point 730) and the distance of each candidate location from the primary visual point of interest (which biases the location score in favor of candidate locations farther from the primary point of visual interest) can produce an optimal or otherwise desired location for display of subtitles that will tend not to interfere with the primary visual point of interest, but also tend not to be placed in a far corner of the screen.

Illustratively, the set of weights may be structured as weight map that includes a weighting factor for each candidate location of the frame, in columns and rows. The weight map may then be multiplied by a distance map that includes a distance from the primary visual point of interest for each candidate location of the frame, in columns and rows. For example, first candidate location 712 is closer to the primary visual point of interest 706 than is the third candidate location 732, which is in the farthest corner of the frame from the primary visual point of interest 706. However, the weights associated with first candidate location 712 and third candidate location 732, respectively, may result in a higher location score for the first candidate location 712 than for the third candidate location 732. The weight associated with a fourth candidate location (not shown) that is closer than the first candidate location 712 to the primary visual point of interest 706 may not be high enough to produce a location score for the fourth candidate location that is higher than the location score for the first candidate location.

At block 610, the subtitle management system 100 can determine the location at which subtitles are to be displayed based on the location scores determined for the candidate locations. The candidate location with the largest location score may be considered to be the location that is least likely to overlap, interfere with, or distract viewers from the primary point of visual interest, without being excessively far from the center of the frame. If multiple location scores have been determined for each candidate location (e.g., corresponding to multiple frames in the scene), the location scores for individual candidate locations over the course of multiple frames may be totaled or averaged for comparison with the total or average location scores of other candidate locations.

At decision block 612, the subtitle management system 100 can determine whether there are additional scenes or other segments of the video content to be analyzed for determining the location at which subtitles are to be displayed. If so, the process 600 can return to block 606. Otherwise, the process 600 can terminate at block 614.

Execution Environment

Figure 8:
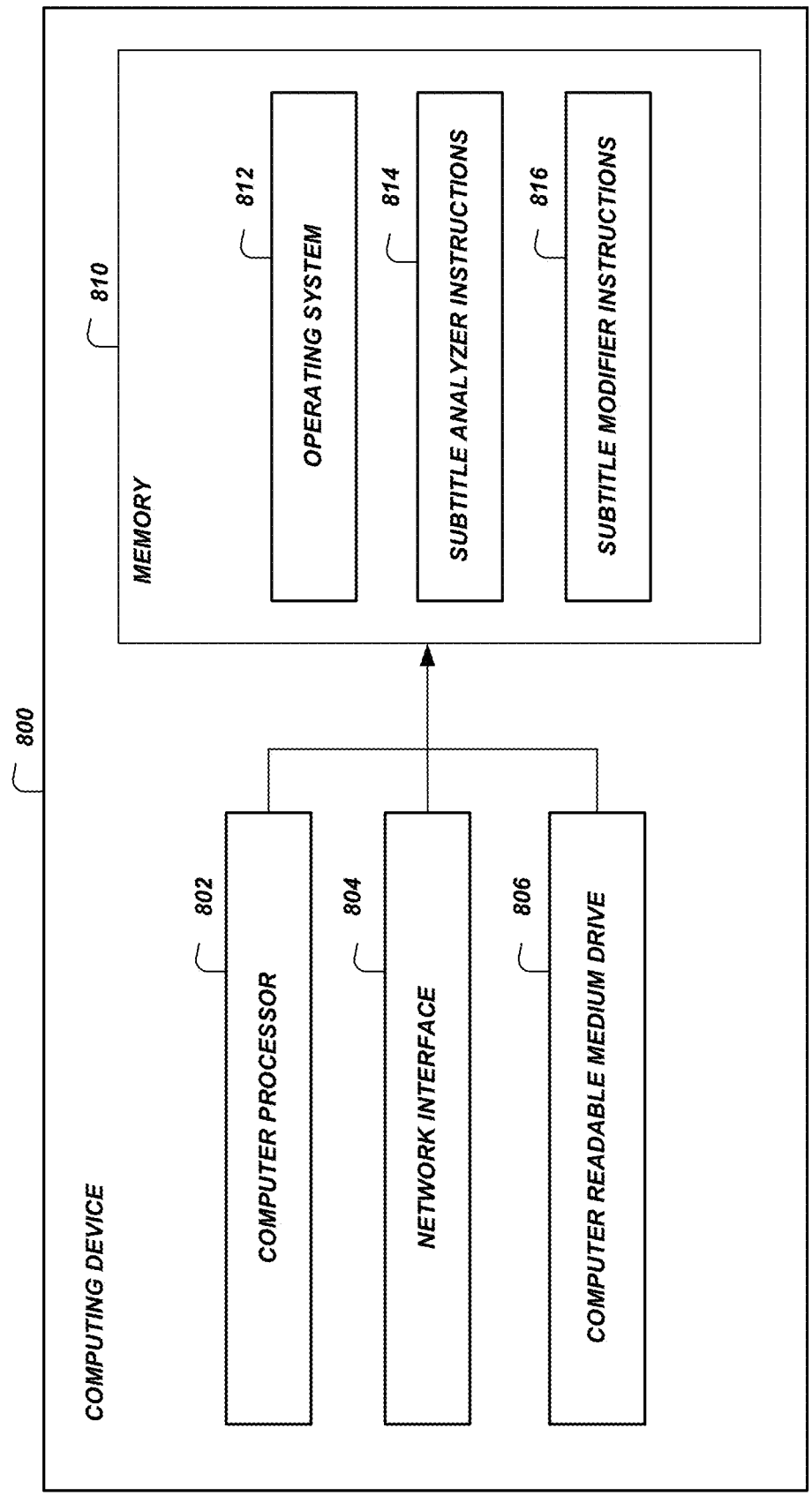
FIG. 8 is a block diagram illustrating components of a computing device configured to execute processes for analyzing and adjusting subtitles for a video according to some embodiments.

FIG. 8 illustrates the various components of an example computing device 800 configured to implement various functionality of the subtitle management system 100. In some embodiments, as shown, the computing device 800 may include: one or more computer processors 802, such as physical central processing units ("CPUs"); one or more network interfaces 804, such as a network interface cards ("NICs"); one or more computer readable medium drives 806, such as a high density disk ("HDDs"), solid state drives ("SDDs"), flash drives, and/or other persistent non-transitory computer-readable media; and one or more computer readable memories 810, such as random access memory ("RAM") and/or other volatile non-transitory computer-readable media.

The computer readable memory 810 may include computer program instructions that one or more computer processors 802 execute in order to implement one or more embodiments. The computer readable memory 810 can store an operating system 812 that provides computer program instructions for use by the computer processor(s) 802 in the general administration and operation of the computing device 800. In some embodiments, the computer readable memory 810 can further include computer program instructions and other information for implementing aspects of the present disclosure. For example, in one embodiment, the computer-readable memory 810 may include subtitle analyzer instructions 814 for implementing features of the subtitle analyzer 112, subtitle modifier instructions 816 for implementing features of the subtitle modifier 114, etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   under control of a computing system comprising one or more computing devices configured to execute specific instructions,
      analyzing a first version of video content using a visual interest model of visual attention of viewers;
      determining a point of visual interest based on analyzing the first version of the video content using the visual interest model;
      determining a first distance between the point of visual interest and a first candidate location for display of subtitles of the video content;
      determining a second distance between the point of visual interest and a second candidate location for display of the subtitles;
      determining a first location score based at least partly on applying a first weight, associated with the first candidate location, to the first distance, wherein the first weight is one of a plurality of weights that bias determination of a display location for the subtitles toward a central display location;
      determining a second location score based at least partly on applying a second weight, associated with the second candidate location, to the second distance, wherein the second weight is one of the plurality of weights;
      determining, based at least partly on an analysis of the first location score with respect to the second location score, that the subtitles are to be displayed at the first candidate location; and
      generating a second version of the video content comprising subtitle data specifying that the subtitles are to be displayed at the first candidate location.

2. The computer-implemented method of claim 1, wherein determining the first distance is based at least partly on a quantity of pixels between the point of visual interest and the first candidate location.

3. The computer-implemented method of claim 1, further comprising:
   generating training data representing eye tracking of a plurality of viewers during presentation of at least one video content item; and
   training the visual interest model using the training data and the at least one video content item.

4. The computer-implemented of claim 1, further comprising:
   determining first color data representing a first color characteristic of the first candidate location;
   determining second color data representing a second color characteristic, wherein the second color data is determined based at least partly on a degree of contrast between the second color characteristic and the first color characteristic; and
   determining that the subtitles are to be displayed using the second color characteristic.

5. The computer-implemented of claim 1, further comprising:
   determining a third distance between the point of visual interest in a second frame of a scene of the video content and the first candidate location in the second frame, wherein the first distance is determined for a first frame of the scene; and determining a fourth distance between the point of visual interest in the second frame and the second candidate location in the second frame, wherein the second distance is determined for the first frame.

6. The computer-implemented of claim 5, further comprising:

determining a first candidate distance based at least partly on the first distance and the third distance; and determining a second candidate distance based at least partly on the second distance and the fourth distance.

7. The computer-implemented method of claim 5, wherein determining the first candidate distance comprises determining one of: an average of the first distance and the third distance, or a sum of the first distance and the third distance.

8. The computer-implemented method of claim 1, further comprising determining a font characteristic for a portion of the subtitles based at least partly on a size of the portion of the subtitles.

9. A system comprising:

a video catalog storing a video content item comprising subtitles representing spoken dialogue; and one or more computing devices in communication with the video catalog and configured to at least:

obtain a recording of a presentation of the video content item by a video presentation device;

generate first text data representing a portion of the spoken dialogue based at least partly on an analysis of an audio presentation portion of the video content item;

generate second text data representing a portion of the subtitles based at least partly on an analysis of a video display portion of the video content item, wherein the portion of the subtitles corresponds to the portion of the spoken dialogue;

determine a similarity score representing a similarity between the first text data and the second text data based at least partly on a number of character-level edits to the first text data to match the second text data;

determine, based at least partly on the similarity score, that the portion of the subtitles represents the portion of the spoken dialogue;

determine a difference between first timing data regarding presentation of the spoken dialogue and second timing data regarding presentation of the portion of the subtitles;

determine a subtitle presentation offset based at least partly on the difference between the first timing data and the second timing data; and modify the video content item based at least partly on the subtitle presentation offset.

10. The system of claim 9, wherein the first timing data represents a time during presentation of the video content item at which the portion of the spoken dialogue is presented, and wherein the second timing data represents a time during presentation of the video content item at which the portion of the subtitles is presented.

11. The system of claim 9, wherein the one or more computing devices are further configured to determine a function representing subtitle presentation offsets for a plurality of portions of the subtitles.

12. The system of claim 9, wherein the one or more computing devices configured to modify the video content item are further configured to modify third timing data by the subtitle presentation offset, wherein the third timing data represents a time during presentation of the video content item at which the portion of the subtitles is to be displayed.

13. The system of claim 9, wherein the one or more computing devices configured to modify the video content item are further configured to modify third timing data based at least partly on a length of the portion of the subtitles, wherein the third timing data represents a duration of time during presentation of the video content item that the portion of the subtitles is to be displayed.

14. A computer-implemented method comprising:

under control of a computing system comprising one or more computing devices configured to execute specific instructions, analyzing a first version of video content using a visual interest model of visual attention of viewers;

determining a point of visual interest based on analyzing the first version of the video content using the visual interest model;

determining a first distance between the point of visual interest in a first frame of a scene of the video content and a first candidate location for display of subtitles of the video content;

determining a second distance between the point of visual interest in the first frame and a second candidate location for display of the subtitles;

determining a third distance between the point of visual interest in a second frame of the scene of the video content and the first candidate location in the second frame;

determining a fourth distance between the point of visual interest in the second frame and the second candidate location in the second frame;

determining, based at least partly on an analysis of the first distance, second distance, third distance, and fourth distance, that the subtitles are to be displayed at the first candidate location; and generating a second version of the video content comprising subtitle data specifying that the subtitles are to be displayed at the first candidate location.

15. The computer-implemented method of claim 14, wherein determining the first distance is based at least partly on a quantity of pixels between the point of visual interest and the first candidate location.

16. The computer-implemented of claim 14, further comprising:

determining first color data representing a first color characteristic of the first candidate location;

determining second color data representing a second color characteristic, wherein the second color data is determined based at least partly on a degree of contrast between the second color characteristic and the first color characteristic; and determining that the subtitles are to be displayed using the second color characteristic.

17. The computer-implemented of claim 14, further comprising:

determining a first candidate distance based at least partly on the first distance and the third distance; and determining a second candidate distance based at least partly on the second distance and the fourth distance.

18. The computer-implemented method of claim 14, further comprising determining a font characteristic for a portion of the subtitles based at least partly on a size of the portion of the subtitles.

19. A system comprising:
computer-readable memory storing executable instructions; and
one or more computer processors in communication with the computer-readable system and programmed by the executable instructions to:
generate training data representing eye tracking of a plurality of viewers during presentation of at least one video content item;
train a visual interest model of visual attention of viewers using the training data and the at least one video content item;
analyze a first version of video content using the visual interest model;
determine a point of visual interest based on analyzing the first version of the video content using the visual interest model;
determine a first distance between the point of visual interest and a first candidate location for display of subtitles of the video content;
determine a second distance between the point of visual interest and a second candidate location for display of the subtitles;
determine, based at least partly on the first distance being greater than the second distance, that the subtitles are to be displayed at the first candidate location; and
generate a second version of the video content comprising subtitle data specifying that the subtitles are to be displayed at the first candidate location.

20. The system of claim 19, wherein the one or more processors are programmed by further executable instructions to:
determine a first location score based at least partly on applying a first weight, associated with the first candidate location, to the first distance, wherein the first weight is one of a plurality of weights that bias determination of a display location for the subtitles toward a central display location; and
determine a second location score based at least partly on applying a second weight, associated with the second candidate location, to the second distance, wherein the second weight is one of the plurality of weights.

* * * * *

UNITED STATES PATENT AND TRADEMARK OFFICE
CERTIFICATE OF CORRECTION

PATENT NO. : 11,070,891 B1  
APPLICATION NO. : 16/708996  
DATED : July 20, 2021  
INVENTOR(S) : Charles Effinger et al.

Page 1 of 1

It is certified that error appears in the above-identified patent and that said Letters Patent is hereby corrected as shown below:

In the Specification

In Column 15, Line 57, delete "("SDDs")," and insert --("SSDs"),--.

In the Claims

In Column 18, Claim 4, Line 53, after "computer-implemented" insert --method--.

In Column 18, Claim 5, Line 64, after "computer-implemented" insert --method--.

In Column 19, Claim 6, Line 8, after "computer-implemented" insert --method--.

In Column 19, Claim 7, Line 15, delete "5," and insert --6,--.

In Column 20, Claim 16, Line 50, after "computer-implemented" insert --method--.

In Column 20, Claim 17, Line 62, after "computer-implemented" insert --method--.

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*